(12) United States Patent
Fremont et al.

(10) Patent No.: US 9,427,834 B2
(45) Date of Patent: Aug. 30, 2016

(54) METHOD OF FABRICATING A COMPOSITE MATERIAL TURBINE ENGINE VANE WITH INCORPORATED PLATFORMS

(71) Applicants: HERAKLES, Le Haillan (FR); SNECMA, Paris (FR)

(72) Inventors: Elric Fremont, Merignac (FR); Romain Nunez, Martignas sur Jalles (FR); Max Massot, Barsac (FR)

(73) Assignees: HERAKLES, Le Haillan (FR); SNECMA, Paris (FR)

( * ) Notice: Subject to any disclaimer, the term of this patent is extended or adjusted under 35 U.S.C. 154(b) by 190 days.

(21) Appl. No.: 14/361,942

(22) PCT Filed: Nov. 26, 2012

(86) PCT No.: PCT/FR2012/052723
§ 371 (c)(1),
(2) Date: May 30, 2014

(87) PCT Pub. No.: WO2013/079860
PCT Pub. Date: Jun. 6, 2013

(65) Prior Publication Data
US 2015/0040396 A1    Feb. 12, 2015

(30) Foreign Application Priority Data
Dec. 1, 2011    (FR) ..................... 11 03663

(51) Int. Cl.
*B23P 15/04* (2006.01)
*B29B 11/16* (2006.01)
(Continued)

(52) U.S. Cl.
CPC ............... *B23P 15/04* (2013.01); *B29B 11/16* (2013.01); *B29C 70/24* (2013.01);
(Continued)

(58) Field of Classification Search
CPC ............ B23P 15/04; Y10T 29/49337; C04B 35/803; C04B 35/565; C04B 35/11; C04B 35/806; C04B 2235/5224; C04B 2235/5244; C04B 2235/614; C04B 2235/5248; B29D 99/0028; B29D 99/0025; B29C 70/24; B29B 11/16; B29L 2031/08; F01D 5/282; Y02T 50/672; F05D 2300/603; F05C 2253/04
See application file for complete search history.

(56) References Cited

U.S. PATENT DOCUMENTS 3,632,460 A * 1/1972 Palfreyman ............. B29C 70/04
156/169
3,718,952 A * 3/1973 Palfreyman ........... B29C 53/564
242/439

(Continued)

FOREIGN PATENT DOCUMENTS

EP    2154119 A1    2/2010
FR    2939129 A1    6/2010
(Continued)

OTHER PUBLICATIONS
International Search Report from corresponding International Application No. PCT/FR2012/052723, Mar. 20, 2013.

*Primary Examiner* — Jason L Vaughan
(74) *Attorney, Agent, or Firm* — Workman Nydegger

(57) ABSTRACT

Multilayer weaving is used to form a fiber blank having a longitudinal direction corresponding to the longitudinal direction of the vane to be made and comprising across its thickness a first woven portion with a plurality of layers of yarns interlinked by weaving, and also a second and third woven portions. The first portion is situated between the second and third portions and interlinked thereto by weaving over only a fraction of its longitudinal dimension. A preform for the vane is formed by folding out, on either side of the first portion, segments of the second and third portions not interlinked with the first portion, by shaping the first portion to form a preform portion for the airfoil of the vane, and by shaping the folded-out segments of the second and third portions to form preform portions for the inner and outer platforms of the vane to be fabricated.

8 Claims, 8 Drawing Sheets

(51) Int. Cl.
  *B29D 99/00* (2010.01)
  *B29C 70/24* (2006.01)
  *F01D 5/28* (2006.01)
  *C04B 35/80* (2006.01)
  *C04B 35/111* (2006.01)
  *C04B 35/565* (2006.01)
  *B29L 31/08* (2006.01)

(52) U.S. Cl.
  CPC ..... *B29D 99/0025* (2013.01); *B29D 99/0028* (2013.01); *C04B 35/111* (2013.01); *C04B 35/565* (2013.01); *C04B 35/803* (2013.01); *C04B 35/806* (2013.01); *F01D 5/282* (2013.01); *B29L 2031/08* (2013.01); *C04B 2235/5224* (2013.01); *C04B 2235/5244* (2013.01); *C04B 2235/5248* (2013.01); *C04B 2235/614* (2013.01); *F05C 2253/04* (2013.01); *F05D 2300/603* (2013.01); *Y02T 50/672* (2013.01); *Y10T 29/49337* (2015.01)

(56) References Cited

U.S. PATENT DOCUMENTS

| | | | | |
|---|---|---|---|---|
| 4,922,968 A * | 5/1990 | Bottger | ............... | D03D 25/005 139/384 R |
| 5,246,736 A | 9/1993 | Goujard et al. | | |
| 5,965,266 A | 10/1999 | Goujard et al. | | |
| 8,221,836 B2 | 7/2012 | Philippe et al. | | |
| 8,499,450 B2 * | 8/2013 | Naik | ............... | B29B 11/16 29/419.1 |
| 8,505,588 B2 * | 8/2013 | Coupe | ............... | D03D 25/005 139/11 |
| 8,607,454 B2 | 12/2013 | Blanchard et al. | | |
| 8,846,147 B2 * | 9/2014 | Eberling-Fux | ............... | C04B 35/52 427/249.2 |
| 9,022,733 B2 * | 5/2015 | Coupe | ............... | C04B 35/524 29/419.1 |
| 9,033,673 B2 * | 5/2015 | Roussille | ............... | F01D 5/147 416/229 A |
| 9,045,992 B2 * | 6/2015 | Roussille | ............... | B29C 70/24 |
| 9,062,562 B2 * | 6/2015 | Coupe | ............... | F01D 25/00 |
| 9,080,454 B2 * | 7/2015 | Coupe | ............... | B29C 70/222 |
| 2002/0064456 A1 * | 5/2002 | Marlin | ............... | B29C 70/34 415/191 |
| 2003/0185673 A1 | 10/2003 | Matsumoto et al. | | |
| 2010/0015428 A1 | 1/2010 | Philippe et al. | | |
| 2011/0311368 A1 | 12/2011 | Coupe et al. | | |
| 2012/0055609 A1 | 3/2012 | Blanchard et al. | | |
| 2012/0099982 A1 | 4/2012 | Coupe et al. | | |
| 2012/0196107 A1 | 8/2012 | Philippe et al. | | |
| 2013/0004715 A1 * | 1/2013 | Jarmon | ............... | B29C 70/24 428/156 |
| 2013/0089429 A1 | 4/2013 | Nunez et al. | | |

FOREIGN PATENT DOCUMENTS

| | | | |
|---|---|---|---|
| FR | 2943942 A1 | 10/2010 | |
| FR | 2956152 A1 | 8/2011 | |
| WO | 2010/061140 A1 | 6/2010 | |
| WO | 2010/116066 A1 | 10/2010 | |
| WO | WO 2010116066 A1 * | 10/2010 | ............ B29C 70/24 |
| WO | 2010/146288 A1 | 12/2010 | |
| WO | 2011/080443 A1 | 7/2011 | |

* cited by examiner

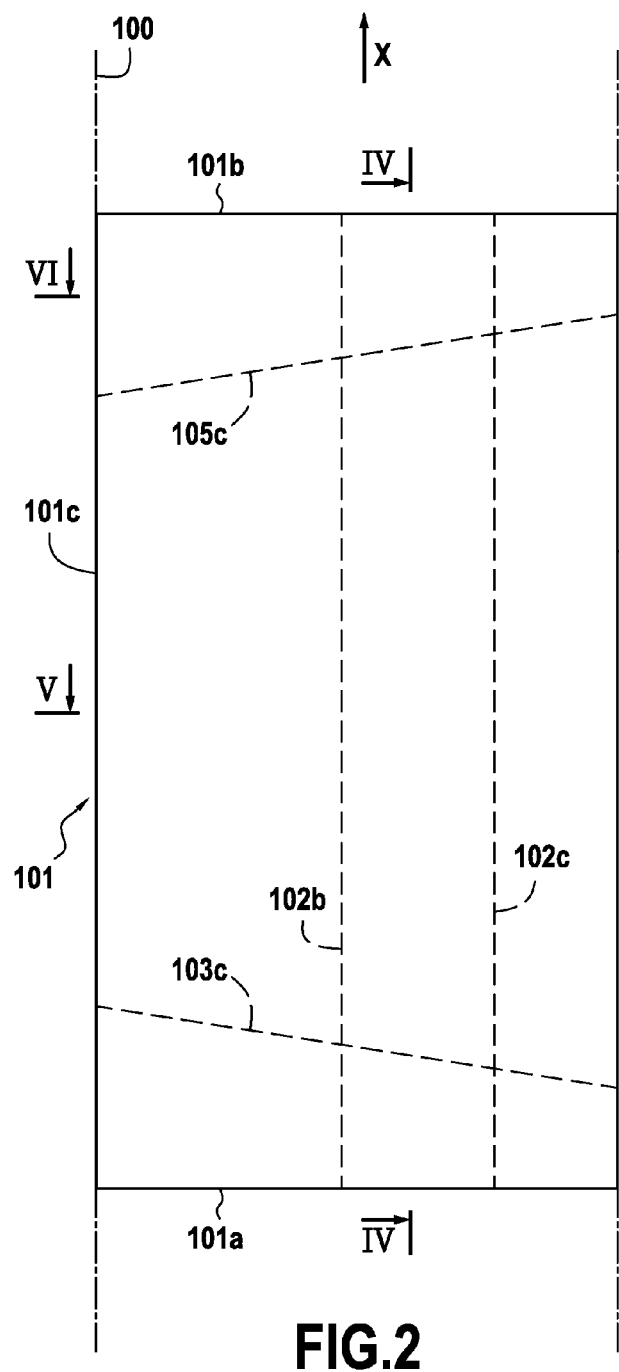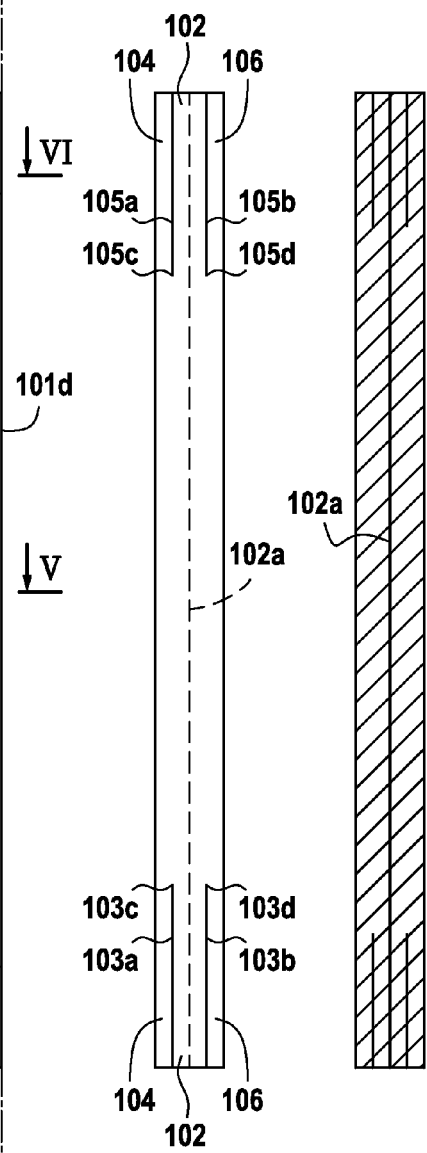

METHOD OF FABRICATING A COMPOSITE MATERIAL TURBINE ENGINE VANE WITH INCORPORATED PLATFORMS

BACKGROUND OF THE INVENTION

The invention relates to turbines or compressors for turbine engines, in particular for aviation turbine engines or for industrial turbines, and it seeks more particularly to fabricate a turbine engine vane with inner and outer platforms incorporated therein for use in a turbine nozzle or a compressor diffuser.

Improving the performance of turbine engines and reducing their polluting emissions leads to envisaging ever-higher operating temperatures.

For elements in hot portions of turbine engines, proposals have thus been made to use ceramic matrix composite (CMC) materials. Such materials possess remarkable thermostructural properties, i.e. mechanical properties that make them suitable for constituting structural elements together with the capacity for conserving these properties at high temperatures. Furthermore, CMC materials are of density that is much lower than that of the metal materials conventionally used for hot portion elements of turbine engines.

Thus, Documents WO 2010/061140, WO 2010/116066, and WO 2011/080443 describe making turbine engine rotor wheel blades out of CMC material with inner and outer platforms incorporated therein. The use of CMC materials for making turbine nozzles has also been proposed, in particular in Document WO 2010/146288.

OBJECT AND SUMMARY OF THE INVENTION

An object of the invention is to provide a simplified method of making a turbine engine vane out of composite material and comprising an airfoil secured to inner and outer platforms.

This object is achieved by a method comprising the following steps:

using multilayer weaving to form a fiber blank having a longitudinal direction corresponding to the direction of the vane to be made and including in its thickness a first woven portion with a plurality of yarn layers that are interlinked by weaving, a second woven portion, and a third woven portion, the first portion being situated between the third portion and the second portion and being interlinked therewith by weaving over only a fraction of its longitudinal dimension;

using the fiber blank to form a preform for the vane to be made, by folding out, on either side of the first portion, segments of the second and third portions that are not interlinked with the first portion, by shaping the first portion to form a preform portion for the airfoil of the vane to be made, and by shaping the folded-out segments of the second and third portions to form preform portions for the inner and outer platforms of the vane to be fabricated; and densifying the vane preform with a matrix to obtain a composite material vane having incorporated inner and outer platforms.

In an implementation, the first portion of the blank presents an internal non-interlinked zone between two layers of adjacent yarns that extends over the entire longitudinal dimension of the first portion of the blank and that is open solely at the longitudinal ends of the first portion of the blank in such a manner as to form, once shaped, a preform portion for the hollow airfoil.

In a particular implementation, the segments of the second and third portions of the blank that are not interlinked with the first portion are situated in longitudinal end portions of the second and third portions of the blank.

In another particular implementation, the second and third portions of the blank are interlinked by weaving with the first portion of the blank in longitudinal end portions, and the segments of the second and third portions of the blank that are not interlinked with the first portion of the blank extend between said longitudinal end portions.

According to a feature of the method, the preform portion for the airfoil has a width that is less than the widths of the preform portions for the inner and outer platforms, and the excess width of the first portion of the blank is eliminated by being cut off in order to shape the preform portion for the airfoil while allowing interlinking to remain between the second and third portions of the blank, via a region of the first portion of the blank, across the entire width of the blank along the connections of said segments with the remainder of the blank.

According to another feature of the method, in order to make a vane for a turbine nozzle or a compressor diffuser, the vane preform is formed with an outer extension extending beyond the preform portion for the outer platform, on its outside, and, while making the vane preform, the outer extension is shaped to form a preform portion for a mounting portion for mounting in a turbine or compressor casing.

According to another feature of the method, in order to make a vane for a turbine nozzle or a compressor diffuser, the vane preform is formed with an inner extension extending beyond the preform portion for an inner platform, on its inside, and, while making the vane preform, the inner extension is shaped to form a preform portion for an attachment portion.

BRIEF DESCRIPTION OF THE DRAWINGS

The invention can be better understood on reading the following description made by way of non-limiting indication and with reference to the accompanying drawings, in which:

FIG. 2 is a diagrammatic plan view of a woven fiber blank for making a fiber preform for a vane of the type shown in FIG. 1;

FIG. 3 is a side view of the FIG. 2 blank;

FIG. 4 is a diagrammatic section view on plane IV-IV of FIG. 2;

DETAILED DESCRIPTION OF EMBODIMENTS

Figure 1:
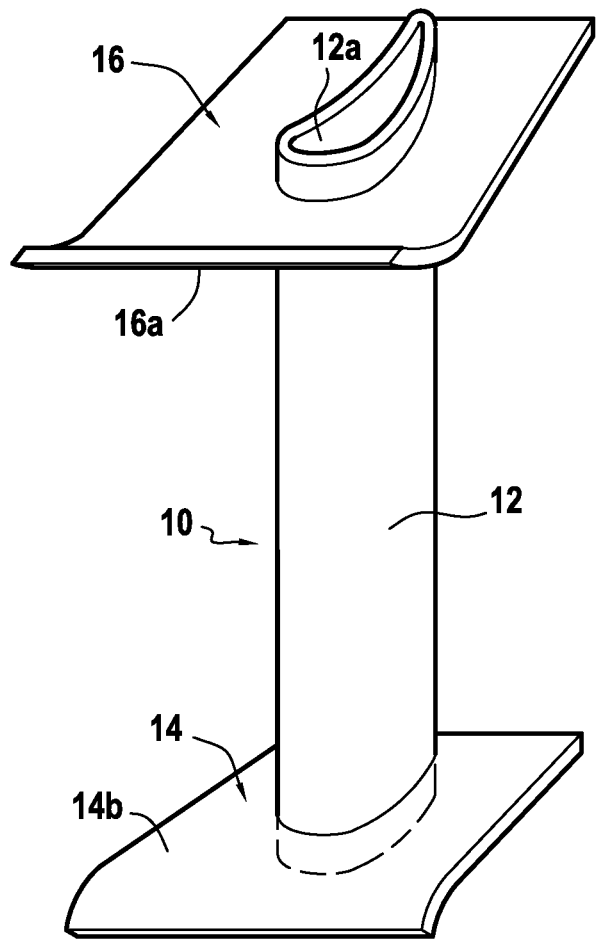
FIG. 1 is a diagrammatic perspective view of a turbine engine vane.

FIG. 1 is a very diagrammatic view of a vane 10, e.g. a stator vane of a turbine nozzle in an aviation turbine engine. The vane 10 comprises an airfoil 12 and inner and outer platforms 14 and 16.

Throughout the specification, the terms "inner" and "outer" are used with reference to radial position relative to the axis of the turbine engine.

The outer face 14b of the platform 14 and the inner face 16a of the platform 16 are for defining the passage for gas flow through the turbine once the vane 10 has been mounted in a turbine casing.

The airfoil 12 extends between the platforms 14 and 16 to which it is secured and, at its ends, it projects from the inside of the platform 14 and from the outside of the platform 16. In the example shown, the airfoil 12 is hollow, with a longitudinal internal passage 12a that extends all along the airfoil and that is open at both ends. In well-known manner, the passage 12a serves in particular to pass a stream of cooling air.

In the example shown, the platforms 14 and 16 extend between their upstream and downstream ends in general directions that form non-zero angles relative to a plane normal to the longitudinal direction of the airfoil 12.

Throughout the specification, the terms "upstream" and "downstream" are used with reference to the stream flow direction through the turbine engine.

The vane 10 is made of composite material. Fabricating the vane comprises forming a fiber preform of a shape corresponding to the shape of the vane and then densifying the preform with a matrix.

FIG. 2 is a plan view of a fiber blank 101 from which the fiber preform of the vane 10 can be shaped.

The blank 101 is obtained from a strip 100 woven by three-dimensional (3D) or multilayer weaving, the strip 100 extending generally in a direction X corresponding to the longitudinal direction of the vane to be fabricated. By way of example, the weaving is performed with warp yarns extending along the direction X, but it should be understood that weaving with weft yarns extending in this direction is also possible. A plurality of blanks 101 may be woven one after another in the direction X. It is also possible to weave a plurality of parallel rows of blanks 101 simultaneously.

In the embodiment of FIGS. 2 to 6, a blank 101 comprises across its thickness: a first portion 102; a second portion 104; and a third portion 106. The portion 102 is situated between the portion 104 and the portion 106 and it is interlinked with the portions 104 and 106 by 3D weaving except in non-interlinked zones 103a and 105a between the portion 102 and the portion 104, and non-interlinked zones 103b, 105b between the portion 102 and the portion 106. The non-interlinked zones 103a and 103b extend across the entire width of the blank 101 (its dimension in the weft direction) from one end 101a of the blank 101 to ends of non-interlinking 103c and 103d. The ends of non-interlinking 103c and 103d extend between the longitudinal edges 101c and 101d of the blank 101 in a direction that makes a non-zero angle relative to the weft direction in order to match the orientation of the inner platform 14. The non-interlinked zones 105a and 105b extend across the entire width of the blank 101 from the other end 101b of the blank 101 to ends of non-interlinking 105c and 105d. The ends of non-interlinking 105c and 105d extend between the longitudinal edges 101c and 101d of the blank 101 in a direction that makes a non-zero angle relative to the weft direction in order to match the orientation of the outer platform 16.

In addition, a non-interlinked zone 102a is formed substantially in the middle of the portion 102 over the entire length of the blank 101 and at a distance from the longitudinal edges 101c and 101d, between limits 102b and 102c.

The non-interlinked zone 102a is to enable the internal passage to be formed inside the hollow airfoil of the vane to be fabricated.

In well-known manner, a non-interlinked zone is arranged between two layers of warp yarns by not passing weft yarns across the non-interlinked zone so as to interlink only the yarns of the warp layers that are situated on either side of the non-interlinked zone.

Figure 5:
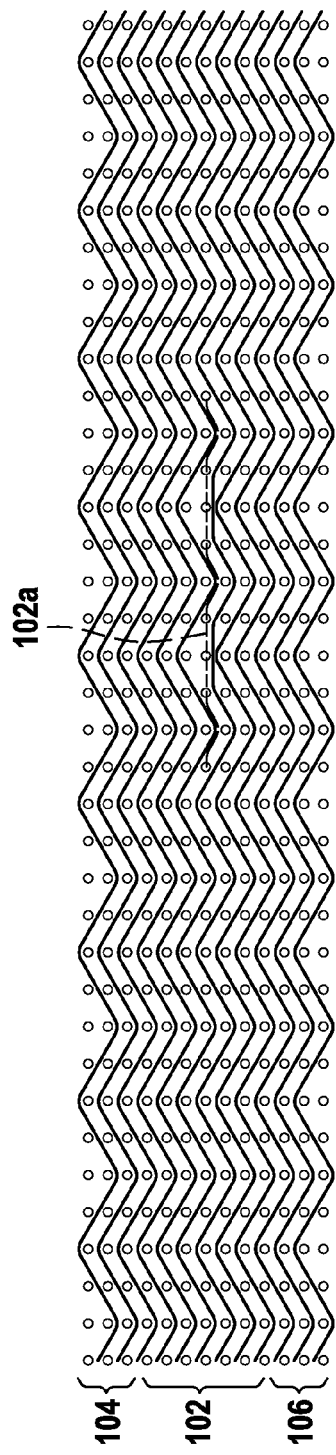
FIGS. 5 and 6 are diagrammatic views on a larger scale of weaving planes in the FIG. 2 blank shown in section view on planes V-V and VI-VI of FIG. 2.
Figure 6:
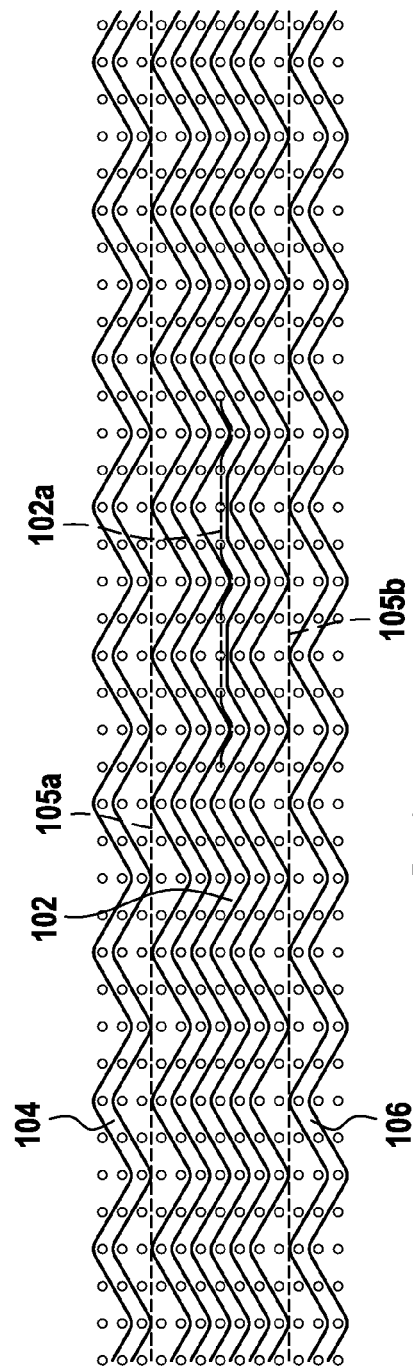

The planes of FIGS. 5 and 6 show an example of 3D weaving with an interlock weave and with non-interlinked zones 102a, 105a, and 105b, the zones for non-interlinking 103a and 103b being obtained in the same manner as the non-interlinked zones 105a and 105b. In FIGS. 5 and 6, the non-interlinked zones are represented by dashed lines. The portion 102 comprises a plurality of layers of warp yarns (six in the example shown) that are interlinked by 3D weaving except in the non-interlinked zone 102a. Each of the portions 104 and 106 has a plurality of layers of warp yarns (three in the example shown) that are interlinked by 3D weaving. Outside the non-interlinked zone 102a, and between the ends of non-interlinking 103c and 105c and between the ends of non-interlinking 103d and 105d, the layers of warp yarns in the portions 102, 104, and 106 are all interlinked in the example shown.

Figure 7:
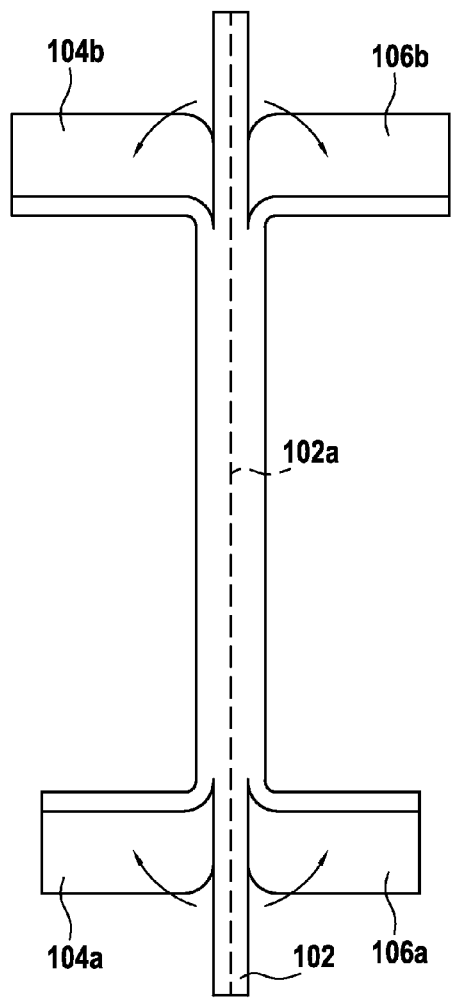
FIGS. 7 to 9 are diagrammatic views showing steps in making a vane preform from the fiber blank of FIGS. 2 to 6.

After weaving, the segments 104a, 104b and 106a, 106b of the portions 104 and 106 that are not interlinked with the portion 102 are folded out as shown in FIG. 7 in order to form preform portions for the platforms 14 and 16, the segments 104a and 104b being adjacent to the non-interlinked zones 103a and 105a, and the segments 106a and 106b being adjacent to the non-interlinked zones 103b and 105b. The folding takes place at the ends of non-interlinking.

Figure 8:
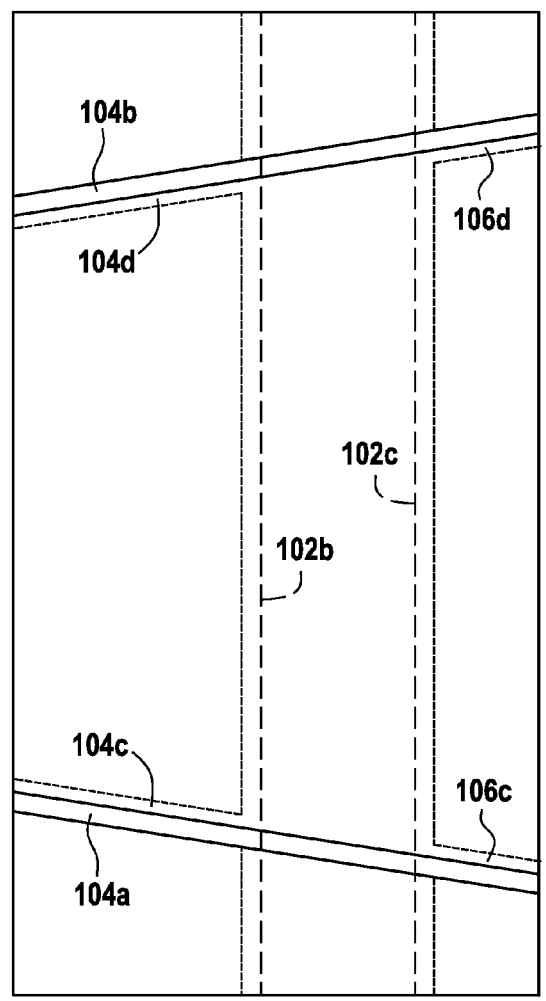

Thereafter, cuts are made along the dotted lines in FIG. 8 in order to remove excess regions, firstly from the segments of the portion 102 situated on the inside of the folded-out segments 104a and 106a, and on the outside of the folded-out segments 104b and 106b, and secondly in the segment of the blank 101 that extends between the folded-out segments so as to leave only those regions that are useful for forming preform portions of the airfoil of the vane to be fabricated. Woven interlinking is preferably also allowed to remain between the portions 102, 104, and 106 over the entire width of the blank 101 in zones extending along the connections between the segments 104a, 104b, 106a, and 106b and the remainder of the blank, thus forming beads 104b, 106c and 104d, 106d. This serves to ensure continuity of the interlinking between the segments 104a and 106a, and between the segments 104b and 106b. Excess regions of the portion 102 on the inside of the segments 104a and 106a, and on the outside of the segments 104b and 106b, may also be removed by being cut off.

It should be observed that while weaving the blank 101, 3D weaving may be omitted in at least parts of the regions that are subsequently eliminated by being cut off.

A fiber preform for the vane to be fabricated is then made by molding using shaping tooling to impart deformations for obtaining the desired hollow airfoil profile and the desired shape for the platforms. A preform 110 is thus obtained (FIG. 9) having a preform portion 102 for the hollow airfoil, and preform portions 114 and 116 for the inner and outer platforms. The internal passage 112a in the preform portion 112 for the hollow airfoil is formed by inserting a tooling element in the non-interlinked zone 102a.

A hollow vane made of CMC, such as that shown in FIG. 1, may be fabricated as follows.

A fiber strip 100 is woven by three-dimensional weaving, the strip comprising a plurality of fiber blanks 101, e.g.

extending in the warp direction, including non-interlinked zones as shown in FIG. 2. The weaving may be performed using ceramic yarns, in particular yarns based on silicon carbide (SiC), e.g. those supplied under the name "Nicalon" by the Japanese supplier Nippon Carbon. Other ceramic yarns can be used, in particular yarns of refractory oxide, such as yarns based on alumina $Al_2O_3$, in particular for CMC materials of the oxide/oxide type (the fibers of the fiber reinforcement and the matrix both made of refractory oxide). It is also possible to use carbon fibers for CMC materials having carbon fiber reinforcement.

In known manner, the fiber strip may be treated to eliminate the sizing present on the fibers and to eliminate the presence of oxides on the surface of the fibers.

Also in known manner, a thin layer of embrittlement-relief interphase coating may then be formed on the fibers of the fiber strip by chemical vapor infiltration (CVI). By way of example, the interphase material is pyrolytic carbon PyC, boron nitride BN, or boron-doped carbon BC. By way of example, the thickness of the layer that is formed may lie in the range 10 nanometers (nm) to 100 nm, in order to conserve a capacity for deformation in the fiber blanks.

Figure 9:
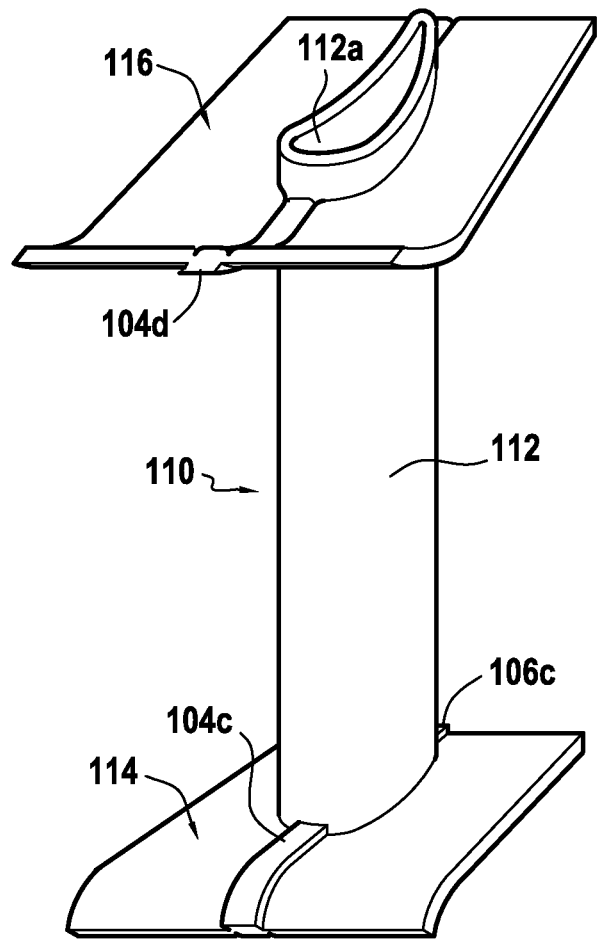
Figures 10, 11, 12:
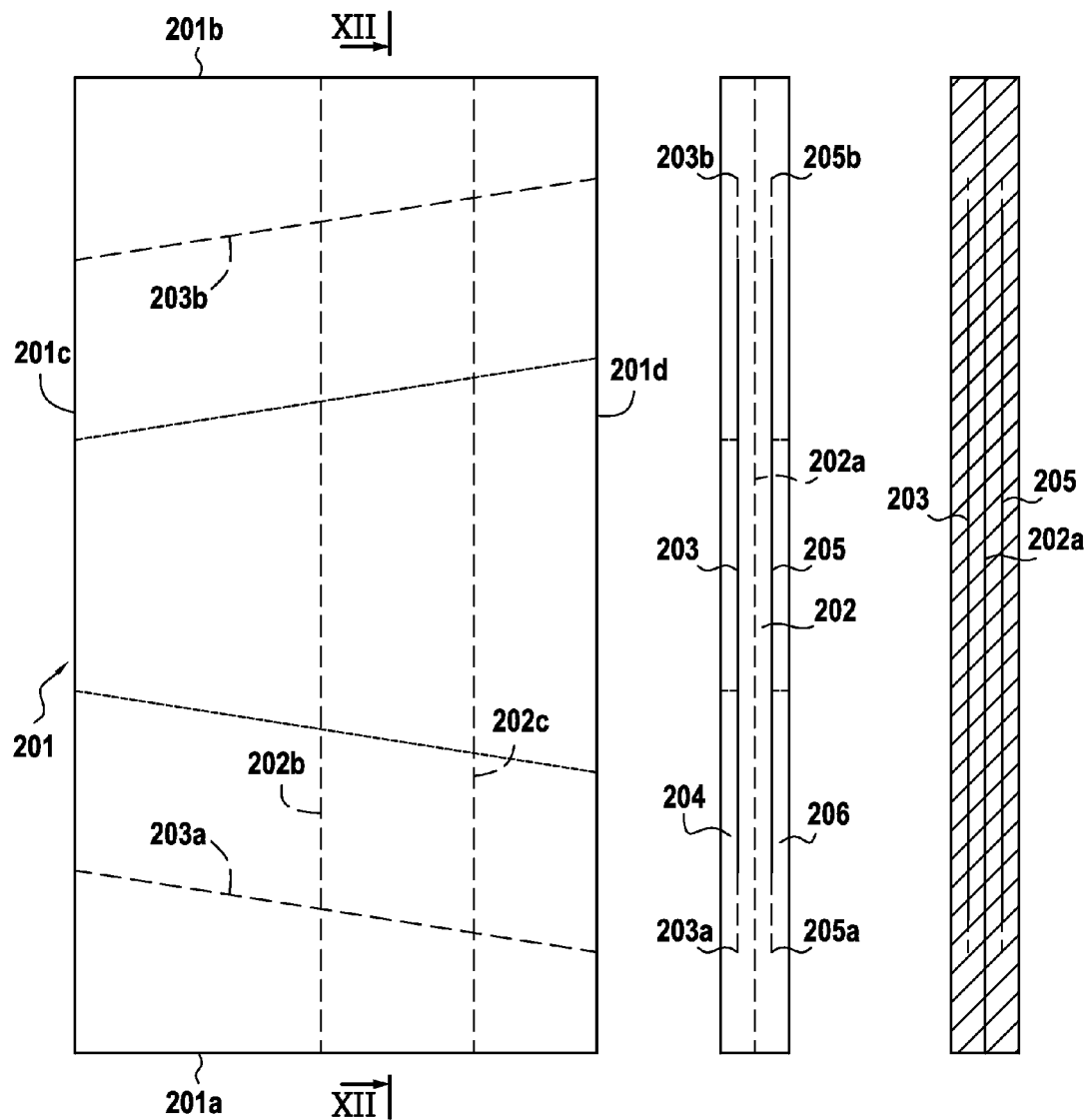
FIG. 10 is a diagrammatic plan view of another embodiment of a woven fiber blank for making a fiber preform for a vane of the type shown in FIG. 1.
FIG. 11 is a side view of the FIG. 10 blank.
FIG. 12 is a diagrammatic section view on plane XII-XII of FIG. 10.

The fiber strip is then impregnated by a consolidation composition, typically a carbon precursor resin or a ceramic precursor resin, possibly diluted in a solvent. After drying, the individual fiber blanks are cut out. Each blank is shaped (as shown in FIGS. 7 to 9) and placed in tooling for the purpose of shaping the airfoil preform portion and the inner and outer platform preform portions.

Thereafter, the resin is cured, and it is then pyrolyzed after removing the preform from the shaping tooling so as to obtain a vane preform that is consolidated by the pyrolysis residue. The quantity of pyrolysis resin used is selected to be sufficient but not excessive so that the pyrolysis residue bonds to the fibers of the preform together sufficiently to enable them the preform to be handled while conserving its shape without the assistance of tooling.

A second embrittlement-relief interphase coating layer may be formed by CVI, e.g. made of PyC, BN, or BC. Making an interphase coating in two layers one before and the other after consolidation is described in Document EP 2 154 119.

The consolidated preform is then densified with a ceramic matrix, e.g. by CVI. The matrix may be made of SiC or it may be a self-healing matrix comprising matrix phases made of pyrolytic carbon PyC, or boron carbide $B_4C$, or of an Si—B—C ternary system as described in particular in Documents U.S. Pat. No. 5,246,736 and U.S. Pat. No. 5,965,266. Other types of ceramic matrix may be envisaged, in particular matrices of refractory oxide, e.g. of alumina, in particular for CMC materials of oxide/oxide type.

The densification is preferably performed in two steps with an intermediate step of machining the vane to its desired dimensions, in particular to eliminate the ridges that result from the beads 104c, 106c, 104d, and 106d, in order to obtain the desired final shape for the platforms 14 and 16 and possibly in order to obtain the profile desired for the airfoil 12.

Another embodiment of a fiber preform for a vane of the type shown in FIG. 1 is described below with reference to FIGS. 10 to 15.

A blank 201 suitable for forming a vane fiber preform is obtained from a strip woven using 3D weaving in a manner similar to the strip 100 of FIG. 2.

The blank 201 comprises across its thickness: a first portion 202; a second portion 204; and a third portion 206. The portion 202 is situated between the portion 204 and the portion 206 and is interlinked with the portion 204 and 206 by 3D weaving except in a non-interlinked zone 203 between the portion 202 and the portion 204, and a non-interlinked zone 205 between the portion 202 and the portion 206. The non-interlinked zones 203 and 205 extend across the entire width of the blank 201 and between ends of non-interlinking 203a, 203b and 205a, 205b that are situated at a distance from each of the opposite ends 201a, 201b of the blank 201. The ends of non-interlinking extend between the longitudinal edges 201c and 201d of the blank 201 in directions that form non-zero angles relative to the weft direction in order to match the orientations of the inner and outer platforms of the vane to be fabricated.

In addition, a non-interlinked zone 202a is formed substantially in the middle of the portion 202 over the entire length of the blank 201 and at a distance from its longitudinal edges 201c and 201d between limits 202b and 202c. The non-interlinked zone 202a is for forming the internal passage in the hollow airfoil of the vane to be fabricated.

Figure 13:
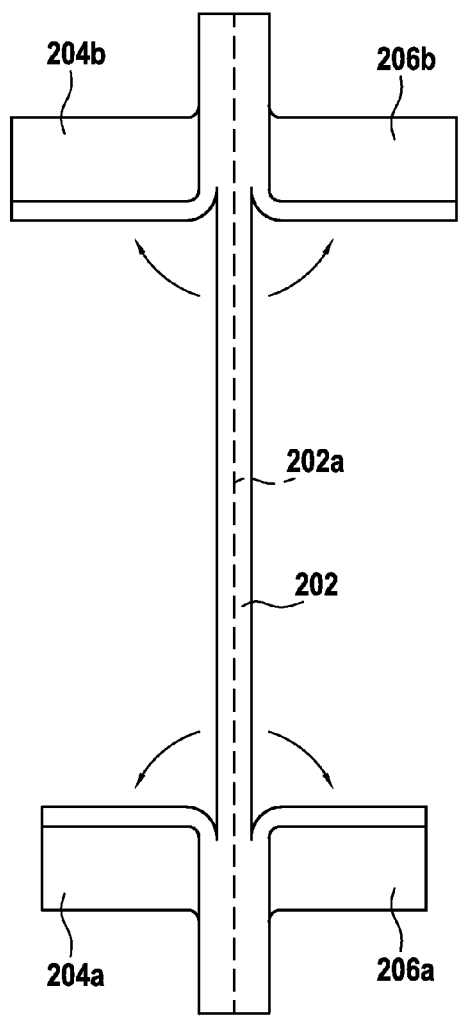
FIGS. 13 to 15 are diagrammatic views showing steps for making a vane preform from the fiber blank of FIGS. 10 to 12.

After weaving, segments 204a and 204b of the portion 204 that are adjacent to the non-interlinked zone 203 and that extend from ends of non-interlinking 203a and 203b are folded out as shown in FIG. 13. In similar manner, segments 206a and 206b of the portion 206 that are adjacent to the non-interlinked zone 205 and that extend from ends of non-interlinking 205a and 205b are folded out as shown in FIG. 13. The folds are made at the ends of non-interlinking.

The segments 204a and 206a, and also the segments 204b and 206b are for use in forming preform portions respectively for the inner and outer platforms of the vane to be fabricated. The lengths of the segments may be limited to the dimensions needed for this purpose, with excess regions of the portions 204 and 206 being eliminated from their middle zones by being cut away, with the lines of cut being represented by dotted lines in FIGS. 10 and 11.

Figure 14:
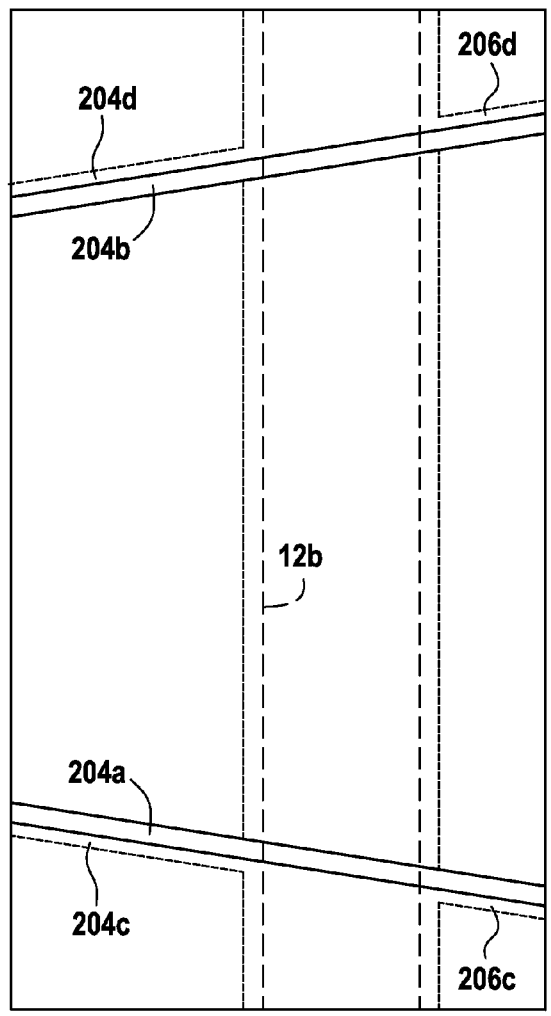

Thereafter, cuts are made along the dotted lines shown in FIG. 14 to eliminate excess regions firstly from the segments of the blank 201 situated on the inside of the folded-out segments 204a and 206a and segments situated on the outside of the folded-out segments 204b and 206b, and secondly from the segment of the portion 202 that extends between the folded-out segments, so as to leave remaining only portions that are useful for forming the preform portion for the airfoil of the vane to be fabricated. Woven interlinking is preferably also allowed to remain between the portions 202, 204, and 206 across the entire width of the blank 201 in zones extending along the connections between the folded-out segments and the remainder of the blank, thereby forming beads 204c, 206c and 204d, 206d.

It should be observed that while weaving the blank 201, it is possible to omit 3D weaving at least in parts of the regions that are eliminated by being cut off.

A fiber preform for the vane to be fabricated is then made by molding using shaping tooling that imparts deformation to obtain the desired profile for the hollow airfoil and the desired shapes for the platforms. A preform 210 is thus obtained (FIG. 15) with a hollow airfoil preform portion 212 having an internal passage 212a, and with inner and outer platform preform portions 214 and 216.

Figure 15:
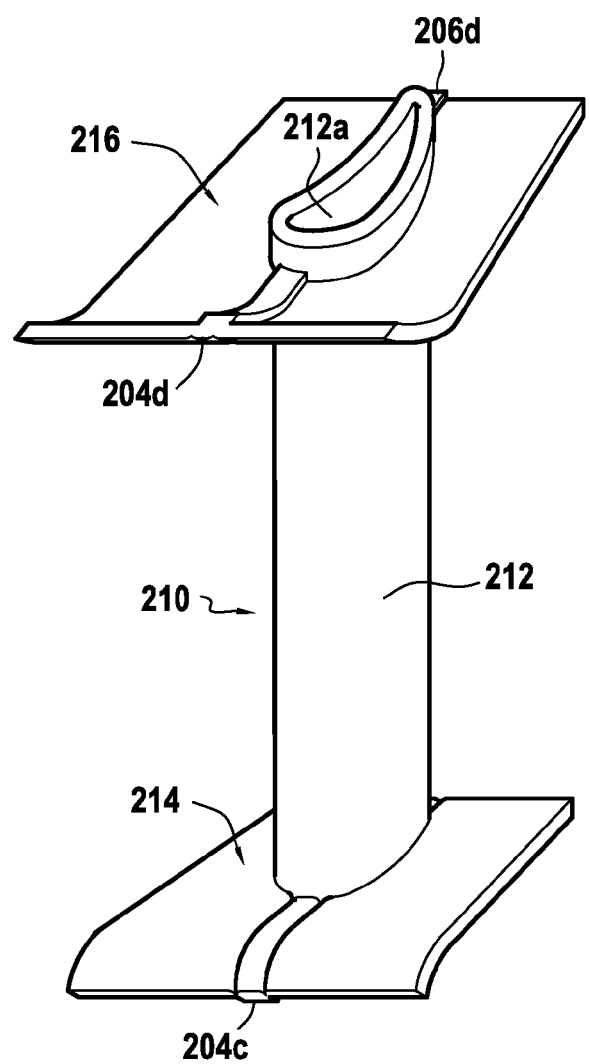

A CMC hollow vane with fiber reinforcement constituted by a preform such as the preform 210 of FIG. 15 may be fabricated in the same manner as that described above.

Figure 16:
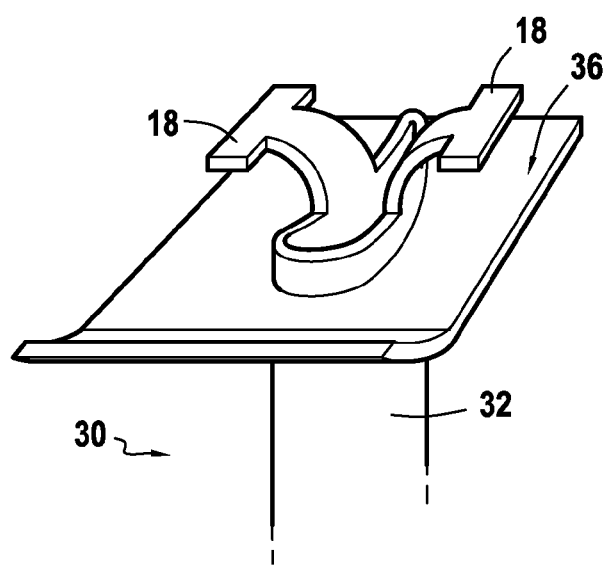
FIG. 16 is a fragmentary view showing a variant embodiment of the FIG. 1 vane.

FIG. 16 is a highly diagrammatic view of the outer portion of a turbine nozzle vane 30 in a variant embodiment of the vane 10 of FIG. 1.

The vane 30 has a hollow airfoil 32 secured to an inner platform (not shown) and to an outer platform 36. The vane 30 differs from the vane 10 of FIG. 1 in that it includes upstream and downstream hooks 18 that are formed in continuity with the airfoil 32 on the outside of the outer platform 36.

For this purpose, when making the fiber preform of the vane, the portion of the fiber blank that forms the airfoil preform is extended on the outside beyond the location of the outer platform, and the extension is shaped by being cut and deformed so as to obtain preform portions that correspond to the hooks 18.

The hooks 18 constitute portions for mounting the vane in a turbine casing.

A similar arrangement may be provided on the inside of the vane by extending the portion of the fiber blank forming the airfoil preform inwards beyond the location of the inner platform, this extension being shaped by cutting and deforming so as to obtain preform portions corresponding to attachment portions. Such attachment portions may be used for connection with an inner casing or for supporting a ring that carries an abradable coating.

The description above relates to making a turbine nozzle vane out of CMC material. The invention is also applicable to vanes for compressor diffusers. For such vanes, when the temperatures that are encountered in service are lower, instead of using a CMC material it is possible to use an organic matrix composite (OMC) material made using fibers, e.g. carbon fibers or glass fibers, together with a polymer matrix.

Under such circumstances, after a set of fiber strips has been woven, and once individual blanks have been cut out and have been shaped using shaping tooling as described above, while each resulting vane preform is being held in its tooling it is impregnated with a resin by injection or infusion. Heat treatment for curing the resin is performed in order to obtain a vane preform. It is possible to perform a plurality of successive cycles of impregnating a resin and of curing it. Final machining may optionally be performed. The resin used for consolidating and densifying purposes is a resin that is a precursor of the polymer matrix, such as an epoxy resin, a bismaleimide resin, or a polyimide resin, for example.

In addition, although the description relates to fabricating vanes with hollow airfoils, the method described is also suitable for making vanes with solid airfoils, in which case the central portion of the fiber blank that is to form a vane preform does not include a non-interlinked zone.

The invention claimed is:

1. A method of fabricating a turbine engine vane out of composite material, the vane comprising an airfoil secured to inner and outer platforms which extend in a lateral direction around a circumference of the airfoil, the method comprising the following steps:
   using multilayer weaving to form a fiber blank having a longitudinal direction corresponding to the direction of the vane to be made and including in its thickness a first woven portion with a plurality of yarn layers that are interlinked by weaving, a second woven portion, and a third woven portion, the first portion being situated between the third portion and the second portion and being interlinked therewith by weaving over only a fraction of its longitudinal dimension;
   using the fiber blank to form a preform for the vane to be made, by folding out, on either side of the first portion, segments of the second and third portions that are not interlinked with the first portion, by shaping the first portion to form a preform portion for the airfoil of the vane to be made, and by shaping the folded-out segments of the second and third portions to form preform portions for the inner and outer platforms of the vane to be fabricated, said folded-out segments of the second and third portions extend in a lateral direction around a circumference of the first portion; and
   densifying the vane preform with a matrix to obtain a composite material vane having incorporated inner and outer platforms.

2. A method according to claim 1, wherein the first portion of the blank presents an internal non-interlinked zone between two layers of adjacent yarns that extends over the entire longitudinal dimension of the first portion of the blank and that is open solely at the longitudinal ends of the first portion of the blank in such a manner as to form, once shaped, a preform portion for a hollow airfoil.

3. A method according to claim 1, wherein the segments of the second and third portions of the blank that are not interlinked with the first portion are situated in longitudinal end portions of the second and third portions of the blank.

4. A method according to claim 1, wherein the second and third portions of the blank are interlinked by weaving with the first portion of the blank in longitudinal end portions, and the segments of the second and third portions of the blank that are not interlinked with the first portion of the blank extend between said longitudinal end portions.

5. A method according to claim 1, wherein the preform portion for the airfoil has a width that is less than the widths of the preform portions for the inner and outer platforms, and the excess width of the first portion of the blank is eliminated by being cut off in order to shape the preform portion for the airfoil while allowing interlinking to remain between the second and third portions of the blank, via a region of the first portion of the blank, across the entire width of the blank along the connections of said segments with the remainder of the blank.

6. A method according to claim 1, wherein, in order to make a vane for a turbine nozzle or a compressor diffuser, the vane preform is formed with an outer extension extending beyond the preform portion for the outer platform, on its outside, and, while making the vane preform, the outer extension is shaped to form a preform portion for a mounting portion for mounting in a turbine or compressor casing.

7. A method according to claim 1, wherein, in order to make a vane for a turbine nozzle or a compressor diffuser, the vane preform is formed with an inner extension extending beyond the preform portion for the inner platform, on its inside, and, while making the vane preform, the inner extension is shaped to form a preform portion for an attachment portion.

8. A method of fabricating a turbine engine vane out of composite material, the vane comprising an airfoil secured to inner and outer platforms, the method comprising the following steps:
   using multilayer weaving to form a fiber blank having a longitudinal direction corresponding to the direction of the vane to be made and including in its thickness a first woven portion with a plurality of yarn layers that are interlinked by weaving, a second woven portion, and a third woven portion, the first portion being situated between the third portion and the second portion and being interlinked therewith by weaving over only a fraction of its longitudinal dimension;
   using the fiber blank to form a preform for the vane to be made, by folding out, on either side of the first portion, segments of the second and third portions that are not interlinked with the first portion, by shaping the first portion to form a preform portion for the airfoil of the vane to be made, and by shaping the folded-out segments of the second and third portions to form preform portions for the inner and outer platforms of the vane to be fabricated; and densifying the vane preform with a matrix to obtain a composite material vane having incorporated inner and outer platforms; and wherein the preform portion for the airfoil has a width that is less than the widths of the preform portions for the inner and outer platforms, and the excess width of the first portion of the blank is eliminated by being cut off in order to shape the preform portion for the airfoil while allowing interlinking to remain between the second and third portions of the blank, via a region of the first portion of the blank, across the entire width of the blank along the connections of said segments with the remainder of the blank.

* * * * *